United States Patent [19]

Ellenberger et al.

[11] Patent Number: 5,252,636
[45] Date of Patent: Oct. 12, 1993

[54] DRY MIXTURE FOR EPOXY CEMENT CONCRETE

[75] Inventors: Peter Ellenberger, Feldmeilen; Qiwei Yang, Zürich, both of Switzerland

[73] Assignee: Sandoz Ltd., Basel, Switzerland

[21] Appl. No.: 803,247

[22] Filed: Dec. 5, 1991

Related U.S. Application Data

[63] Continuation of Ser. No. 556,602, Jul. 20, 1990, abandoned.

[30] Foreign Application Priority Data

Jul. 20, 1989 [DE] Fed. Rep. of Germany ....... 3923972

[51] Int. Cl.⁵ ............................................... C08L 63/00
[52] U.S. Cl. .................................................... 523/401
[58] Field of Search ......................................... 523/401

[56] References Cited

U.S. PATENT DOCUMENTS

| | | | |
|---|---|---|---|
| 3,948,830 | 4/1976 | Donnelly et al. | 523/401 |
| 4,501,830 | 2/1985 | Miller et al. | 523/401 |
| 4,957,951 | 9/1990 | Marohn | 523/401 |

Primary Examiner—Melvyn I. Marquis
Assistant Examiner—D. Aylward
Attorney, Agent, or Firm—Robert S. Honor; Richard E. Vila

[57] ABSTRACT

A storage stable dry mixture for resin containing cement compositions is produced by contacting the resin and the hardener with a finely divided, solid adsorbent having a surface area of at least 0.2 m²/g which is of an amorphous nature and is produced by a pyrogenic method, before mixing these components with cement.

13 Claims, No Drawings

DRY MIXTURE FOR EPOXY CEMENT CONCRETE

This is a continuation of application Ser. No. 07/556,602, filed Jul. 20, 1990 abandoned.

The invention relates to cement compositions containing a reactive resin and a hardener comprising a dry mixture of ingredients which mixture is storage stable and suitable for the preparation of mortars and concretes.

It is known from EP 207473 to produce such a dry mixture of ingredients by the preparation of a premixture A containing part of the components and a premixture B containing the rest of the components and by the mixing of premixture A with premixture B shortly before contacting the dry mixture with water. According to claim 4 of this patent a storage stable dry mixture should be obtainable and one example is given for such a mixture (Example 3) in which the hardener is sprayed at a temperature of 80° C. on fine particles of silicic acid. It has, however, been found that a dry mixture obtained according to this example is not storage stable because it hardens quickly and loses its workability.

In GB 1207023 hydraulic grouts, mortars and concretes are described which contain a viscous binder, e.g. epoxy resin, added towards the end of the mixing process and fixed on a solid support of particle size less than 80 microns. The support can be lime, hydraulic binder or powders of siliceous or calcareous origin. No disclosure is however, given of a storage stable dry mixture.

An object of the invention is to provide a storage stable dry mixture of ingredients for resin containing cement compositions which are simply mixed with water at the job site in order to produce mortars and concretes with excellent properties. It has been found that this can be achieved when the reactive resin as well as the hardener are inactivated by the presence of a finely divided, solid adsorbent having a surface area of at least 0.2 m$^2$/g and being of an amorphous nature and produced by a pyrogenic method.

The invention, therefore, provides a process for the production of a storage stable dry mixture for cement compositions comprising hydraulic binder, aggregate, reactive resin and hardener by contacting the reactive resin and the hardener with a finely divided, solid adsorbent having a surface area of at least 0.2 m$^2$/g and being of an amorphous nature and produced by a pyrogenic method, before mixing them with the hydraulic binder. The invention further provides the resultant dry mixture cement compositions and their use in the production of resin containing mortars and concretes.

Preferably the finely divided, solid adsorbents according to the invention are non-crystalline silicium containing materials in the form of small grains which have some affinity to the reactive resin and to the hardener by the fact that they are preferably produced by a pyrogenic method and have a high specific surface area. They can have pozzolanic properties but should not interfere with the hydraulic activity of the binder. Examples of such materials are fly ash, trass, blast furnace slag, silica fume and bentonite, as well as, in principle, carbon black and activated silica could be used as long as the color and/or the price of the product does not exclude its use.

Preferably it is, however, important that the particle size of the adsorbent should be at most 0.05 mm and that its specific surface area should be at least 0.2 m$^2$/g. With diminishing particle size and increasing surface area the affinity of the material will increase so that less material is necessary to inactivate the resin and the hardener. In contrast, it has been found that crystalline materials having the same particle size and specific surface area cannot be used with the same effect because the dry mixture is not storage stable, i.e. it hardens by the reaction of the resin with the hardener. For this reason, the material according to the invention should comprise at least 90% particles of an amorphous nature.

Preferred adsorbents according to the invention are fly ash and silica fume, which can be used alone or both together in the same mixture. Fly ash is a well-known by-product of power plants with varying particle size (in general, more than 80-90% is below 0.04 mm and the average below 40 micron) and a specific surface area from 0.2 to 0.6 m$^2$/g (preferably from 0.35 to 0.44 m$^2$/g) whereas silica fume is a by-product of the production of metallic silicon or ferrosilicon alloys and its particle size in general is below 0.1 micron (with a specific surface area of about 20 m$^2$/g).

For the production of the dry mixture it is advantageous to mix first a part of the aggregate (normally sand) with the reactive resin or the hardener, then to apply the solid adsorbent and only at the end the hydraulic binder, whereas the other reaction component, i.e. the resin or the hardener, is mixed with the rest of the aggregate, then with solid adsorbent and with hydraulic binder.

The other components of the mixture, i.e. additives and admixtures, are added to one or both of the premixtures and finally these two premixtures are put together. It is, however, also possible to contact the resin and/or the hardener first with the solid adsorbent which can be different for the resin and for the hardener, whereupon all components are mixed together in one procedure.

The preferred procedure is to mix the reactive resin first with an adhesion improving agent and a dispersing agent, to put it on sand and to contact it with fly ash and then mix it with Portland cement and a water retention agent which gives the premixture A. The hardener is mixed with a defoaming agent, contacted with fly ash and then mixed with sand, Portland cement, a superplasticizer and a gas eliminating agent which gives the premixture B which is put together with premixture A.

The reactive resin used in the dry mixture according to the invention is the well-known type of polymeric substance which is cured by the reaction with a hardener and is commercially available as the so-called two component resin. Examples of such resins are polyurethane and epoxy resins. The corresponding hardener is a compound containing isocyanate respective amino groups, depending on the resin used.

The hydraulic binder used in the dry mixture according to the invention can be any type of cement like Portland cement, slag cement, pozzolanic cement, high-alumina cement and preferably sulphate-resistant cement, i.e. with a low content of aluminate. The aggregate used can be any type of aggregate, depending on the final use of the dry mixture. In general, all types of sand, gravel and artificial additions like blast furnace slag, metallurgical slags, incinerator residues, etc. can be used and also for special applications organic materials and steel, glass and plastic fibres can be added.

Further additives for the dry mixture of the invention are in general organic compounds added to cement compositions to influence their properties and comprise adhesion improving agents, defoaming agents, corrosion inhibitors, dispersing agents, gas eliminating agents, etc. as well as typical admixtures for cement compositions like plasticizers, superplasticizers, air entraining agents, accelerators, retarders, etc.

A preferred cement containing dry mixture comprises cement and
2-25% by weight, preferably 5-20% of a reactive resin
2-25% by weight, preferably 5-20% of a hardener
0-50% by weight, preferably 8-30% of silica fume
10-150% by weight, preferably 30-100% fly ash
50-500% by weight, preferably 100-400% of aggregate
0.5-10% by weight, preferably 1-3% of admixtures
0-10% by weight, preferably 0.5-6% of other additives
all percentages being by weight of the cement present.

The dry mixture according to the invention can be used in various construction fields. When using sand as the aggregate, the mortars made up with it can be used for repairing concrete constructions, for flooring and for coating purposes. When using coarse aggregate, the concrete made up with it can be used for construction. A dry mixture containing the appropriate components can be used for shotcreting.

In the following examples all parts and percentages are by weight and all mixing operations are performed at ambient temperature (25° C.).

EXAMPLE 1

63.68 parts of sand with particles up to 4 mm are mixed with 1.17 parts of epoxy resin, 2.12 of parts silica fume and 21.23 of parts Portland cement (preferably sulphate-resistant cement) in the given order. At the same time, 1.19 parts of hardener are mixed with 10.61 parts of fly ash and both mixtures finally put together. The obtained dry mixture can be stored like cement and still flows easily after several months. It can be mixed with water to produce a resin containing mortar.

As an alternative, sand can also be mixed with the hardener, silica fume and cement whereas the resin is mixed with fly ash.

EXAMPLE 2

Following the mixing procedure of Example 1, the following dry mixture can be produced:

| | |
|---|---|
| epoxy resin | 1.8 parts |
| hardener | 1.83 parts |
| Portland cement (preferably sulphate-resistant cement) | 16.50 parts |
| silica fume | 2.44 parts |
| fly ash | 12.21 parts |
| plasticizer | 0.31 parts |
| sand 0/4 mm | 64.91 parts |
| | 100.00 parts |

The plasticizer is added to the second mixture (fly ash and resin or hardener).

EXAMPLE 3

The dry mixtures of Examples 1 and 2 can also be obtained by first mixing fly ash with resin or hardener and silica fume with resin or hardener whereafter all other components are added in one mixing step.

EXAMPLE 4

Premixture A is obtained by mixing 25.49 parts quartz sand (particles up to 0.75 mm) with 1.56 parts epoxy resin (mixture of 1.39 parts resin, 0.03 parts adhesion improving agent and 0.14 parts dispersing agent), adding 3.55 parts fly ash, 18.68 parts Portland cement and finally 0.72 parts water retention agent.

Premixture B is obtained by mixing 16.12 parts fly ash with 1.79 parts hardener (1.49 parts hardener and 0.3 parts defoaming agent), 22.07 parts quartz sand (0/0.75 mm), 9.42 parts Portland cement, 0.5 parts superplasticizer and 0.1 parts gas eliminating agent.

The combination of premixture A and premixture B is a storage stable dry mixture which can be mixed anytime with water to produce a resin containing mortar.

What is claimed is:

1. A process for the production of a storage stable dry mixture for cement compositions comprising hydraulic binder, aggregate, reactive resin and hardener, characterised by the step of contacting the reactive resin and the hardener with a finely divided, solid adsorbent having a surface area of at least 0.2 $m^2/g$, being of an amorphous nature and being produced by a pyrogenic method, before mixing these components with the hydraulic binder.

2. A process according to claim 1, in which the solid adsorbent is silica fume and/or fly ash.

3. A process according to claim 1, in which the hydraulic binder is Portland cement.

4. A process according to claim 1, in which the aggregate is sand.

5. A process according to claim 1, in which the reactive resin is mixed with sand, then fly ash is applied and finally Portland cement is added, whereas the hardener is first contacted with fly ash and then mixed with sand and Portland cement, and both premixtures are put together.

6. A cement containing dry mixture comprising cement and
2-25% by weight of a reactive resin
2-25% by weight of a hardener
0-50% by weight of silica fume
10-150% by weight of fly ash
50-500% by weight of aggregate
0.5-10% by weight of admixtures
0-10% by weight of other additives
all percentages being by weight of the cement present.

7. A cement containing dry mixture according to claim 6, comprising cement and
5-20% by weight of a reactive resin
5-20% by weight of a hardener
8-30% by weight of silica fume
30-100% by weight of fly ash
100-400% by weight of aggregate
1-3% by weight of admixtures
0.5-6% by weight of other additives
all percentages being by weight of the cement present.

8. A dry mixture according to claim 6, in which the reactive resin is an epoxy resin and the hardener is a polyamine compound.

9. A dry mixture according to claim 6, in which the additives comprise adhesion improving agents, defoaming agents, corrosion inhibitors, dispersing agents, gas eliminating agents, plasticizers, superplasticizers, air entraining agents, accelerators, retarders.

10. A dry mixture for cement compositions prepared according to the process of claim 1.

11. A process for the preparation of mortars or concrete, in which a dry mixture according to claim 6 is mixed with water.

12. A process according to claim 1, in which the hydraulic binder is sulphate-resistant cement.

13. A process according to claim 1, in which each of the reactive resin and the hardener is mixed separately with a portion of the aggregate, solid adsorbent and hydraulic binder, and the two mixtures thus produced are then mixed.

* * * * *